May 7, 1929.  1,711,870
O. ZERK, NOW BY JUDICIAL CHANGE OF NAME O. U. ZERK
LUBRICATING MEANS
Filed May 29, 1922  2 Sheets-Sheet 1
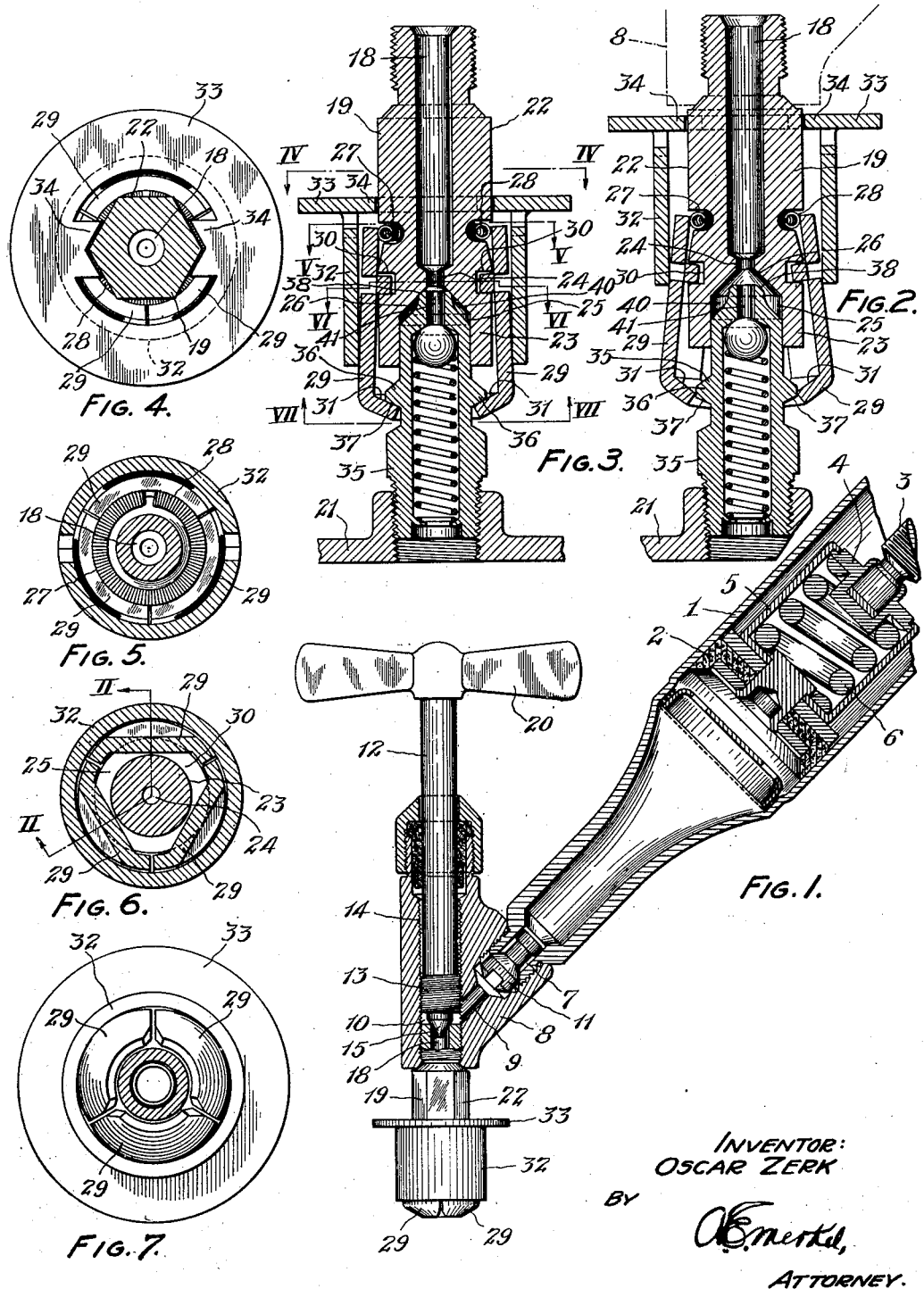
INVENTOR:
OSCAR ZERK
BY
ATTORNEY.

INVENTOR:
OSCAR ZERK
BY
ATTORNEY.

Patented May 7, 1929.

1,711,870

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE ALEMITE MANUFACTURING CORPORATION, OF CHICAGO, ILLINOIS, A CORPORATION OF DELAWARE.

LUBRICATING MEANS.

Application filed May 29, 1922. Serial No. 564,284.

My invention relates to lubricating devices and especially to lubricating devices designed to supply lubricant under high pressure to wearing parts of machinery, by means of a pressure or grease gun, which is connected with the parts to which lubricant is to be supplied, by means of a detachable coupling.

In devices of this character heretofore employed, a self-sealing leather gasket which seals the joint between the coupling members, has been necessarily employed. Such a gasket is found, however, to be a source of much trouble and annoyance, and particularly in the case of automobile lubrication, inasmuch as grit and dust from the street accumulate on the coupling nipples and when, through carelessness they are not removed, are transferred onto the gasket in which they embed themselves and soon accumulate therein to such an extent that the gasket loses its efficiency as a self-sealing, snug fitting and yielding element, which results in leakage, loss of lubricant and the attendant annoyances, as is well known to those skilled in the art. Furthermore, impurities in the lubricant such as metal filings or chips likewise become embedded in the gasket with similar results.

The objects of my invention are:

First, the elimination of the heretofore used leather gasket without sacrificing non-leaking qualities.

Second, the elimination of wear on the coupling member which is attached to the pressure gun.

Third, an arrangement and form of parts whereby the accurate seating of the coupling members may be effected readily and easily.

Fourth, the provision of simple and effective means whereby the coupling members may be connected by a powerful joint with a minimum of manual labor.

The first of these objects is attained by providing a contact surface on the one coupling member of comparatively very small annular area which engages a co-operating contact surface on the other member, and providing a cavity or chamber adjacent thereto and exteriorly of such first named member, whereby obstructions such as grit and dirt will be expelled from between these surfaces either into the member's central duct or into such cavity or chamber into which latter they may accumulate and later be removed.

The second of these objects is attained by making the seating surface of the coupling member of the gun, very much harder than that of the other member. This is important in automobile lubrication wherein a large number of nipples is used, usually from 25 to 75. This means that the coupling on the gun is used from 25 to 75 times as often as the nipples are used and that the wear on such gun coupling contact surface is correspondingly greater. By making this latter coupling surface of extreme hardness, the tendency to wear as a result of such excessive use is compensated for.

The third object is attained by making the contact surfaces of the couplings conical or valve-like in form whereby it will be seen, the parts become self centering.

The fourth object is attained by hardening the contact surfaces of the sliding parts of the means which are used to hold the coupling members together.

The construction lends itself most advantageously to the employment of all-metal contact surfaces in the coupling members.

The said invention consists of means hereinafter fully described and particularly pointed out in the claims.

The annexed drawings and the following description set forth in detail certain means embodying the invention, the disclosed means, however, constituting but one of various mechanical forms in which the principle of the invention may be employed.

In said annexed drawings:

Fig. 1 represents an axial section of the lower end of a pressure or grease gun embodying my invention, parts being shown in elevation, shown in full or actual size.

Fig. 2 represents an enlarged axial section of the coupling end of the gun, a fragment of the mechanism to be lubricated, together with a nipple attached to said mechanism, showing the parts in partially detached position, and twice actual size.

Fig. 3 represents the parts shown in Fig. 2, showing the parts clamped or joined together.

Fig. 4 represents a transverse section taken upon the plane indicated by line IV—IV, Fig. 3.

Fig. 5 represents a transverse section taken upon the plane indicated by line V—V, Fig. 3.

Fig. 6 represents a transverse section taken upon the plane indicated by line VI—VI, Fig. 3.

Fig. 7 represents a transverse section taken upon the plane indicated by line VII—VII, Fig. 3.

Figure 8:
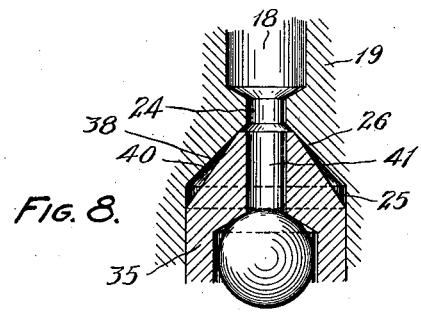

Figs. 8 to 15 inclusive represent fragmentary sections four times the actual size of the device and illustrating various forms of contact surfaces which may be used and embodying certain principles of my invention.

Referring first to Figs. 1 to 7 inclusive, the illustrated embodiment of my invention includes a cylinder or barrel 1, Fig. 1, in which there is a piston 2 actuated to move in the barrel by a screw-stem 3, suitably mounted on the top of the barrel (not shown). The stem's lower end is secured to a disk 4 which travels in an inner cylinder 5 and against a coil spring 6 mounted therein.

The lower part of the barrel is provided with the outlet duct 7 and is screwed into a body member 8 at an angle preferably of about 45°. This body member is provided with a duct 9 which communicates with a cylindrical bore 10 also formed on this body member as shown. A fibre check valve 11 controls the communication between duct 9 and the barrel 1, permitting the lubricant to pass from the cylinder to the duct but preventing the opposite movement thereof.

Bore 10 is of considerably smaller diameter than that of the interior of barrel 1, and is threaded throughout as shown.

A stem 12 is mounted in said bore and has a threaded portion 13 engaging the threads 14 of the bore. The lower end of the stem is formed with a needle valve 15 which is adapted to close the upper end of the duct 18 in coupling member 19 which is screwed into the lower end of said bore 10. The stem 12 is suitably packed off and provided with the handle 20 for manual operation.

The construction thus far described forms no part of my present invention but is claimed in my copending application, Serial No. 684,168, filed January 3, 1924.

Said construction operates as follows:

Lubricant is supplied to the interior of barrel 1 in any suitable manner. Needle valve 15 is caused to close duct 18. Stem 3 is then caused to move the piston 2 downwardly against the lubricant and compress same into the bottom of the barrel, past the check valve 11 and beneath the end of stem 12. Such movement is continued until spring 6 is compressed as far as it may be.

The coupling member 19 is then attached to a nipple, in a manner hereinafter described, whereupon the stem 12 is turned to open duct 18 which allows the compressed lubricant to flow through the coupling and to the mechanism 21 which it is desired to lubricate. The coil spring 6 causes piston 2 to follow the lubricant as the pressure is released, thus supplying additional pressure which insures an adequate supply of lubricant to the point desired.

If it be desired to supply the lubricant under still greater pressure, the stem 12 may be screwed upwardly a suitable distance and the bore 10 supplied with additional lubricant from the barrel 1. By now screwing the stem 12 down upon such lubricant, it acts as a piston and forces same through the coupling, valve 11 preventing its reentry into the barrel. By selecting a small diameter for bore 10 and a small pitch for threads 14 it will be seen that an enormous pressure may be exerted by this auxiliary pressure device upon the lubricant and the latter forced to flow against great resistance. This enables me to cause the lubricant to reach the desired place often, by reason of obstruction, otherwise inaccessible. I have found in practice that a pressure of 10,000 lbs. per square inch may be readily attained by manual operation of the stem 12.

The coupling member 19 is provided with a hexagonal upper guiding portion 22, Fig. 1, and a cylindrical lower portion 23 through which extends the central duct 18 restricted at 24. The lower end portion of the latter is cylindrically enlarged as at 25 and formed with the conical seating surface 26. Portion 23 is formed with a circumferential groove 27 in which is seated an elastic ring 28. This ring presses outwardly against the upper ends of three oscillatory annularly segmental jaws 29 which are fulcrumed in a circumferential groove 30, Fig. 2. The lower ends of these jaws are bent inwardly and form wedge surfaces 31.

A sleeve 32 surrounds these jaws and is provided with an upper flange 33 which forms means for manually actuating the sleeve. Lugs 34 engage lateral surfaces of the guiding portion 22 and centre the sleeve, see Fig. 4.

The nipple 35, which is attached to the mechanism 21, is provided with a flange 36 forming a lower conical wedge surface 37, which may be engaged by the wedge surfaces 31 of the jaws. The upper end of the nipple is provided with the conical seating or contact surface 38, hereinafter more fully described.

The described parts are so designed that when the sleeve 32 is pulled up, as shown in Fig. 2, the jaws may open sufficiently to allow the lower ends thereof to slip over flange 36, Fig. 2. In this position the ring 28 exerts at all times enough pressure upon the upper ends of the jaws to set up sufficient friction between the jaws and sleeve to hold the latter in this suspended position thus facilitating the act of engagement of the parts by rendering it unnecessary to hold the sleeve up by hand.

The parts are further so designed that when the seating surfaces 26 and 38 are in contact, wedge surfaces 31 and 37 may engage each other, but in such a manner that the jaws will be outwardly inclined, that is present a conical exterior surface of greater major diameter than the inner diameter of sleeve 32, as shown in Fig. 3. Downward pressure upon the sleeve 32 will hence exert a wedging action upon the jaws and increase the intimacy of contact of surfaces 31 and 37 and hence the intimacy of the engagement of the seating surfaces 26 and 38. It will be seen that the angularity of these surfaces 31 and 37 and the angularity of the conical wedge surface presented by the exterior of the jaws may be made such that a very powerful force may be exerted upon the surfaces 26 and 38 and effect a tight and leak-proof joint. So great may be this force that I have found in practice it may be made as high as 20,000 lbs. per square inch on the small contacting surface used. To increase the facility for obtaining this force I case-harden the sleeve 32 and the jaws 29, which greatly reduces the frictional resistance between the exterior surface of the jaws 29 and the interior surface of the sleeve and forms an important factor in obtaining this great pressure.

It will also be noted that no part of the member 19 intervenes between the opposite ends of the jaws and the flange 33 so that the entire space between the flange and jaws is available for the travel of the sleeve. When the device is constructed, however, the relation of the jaws and sleeve is such that when the jaws occupy their clamping position of greatest effectiveness, the sleeve flange 33 will not engage the upper ends of the jaws. This allows the sleeve to be pushed on down further as the parts wear from continued use, until finally limited by contact of the flange with the jaws. This feature of the construction allows the sleeve to operate in a field of maximum effectiveness, since the further away from the fulcrum of the jaws, the sleeve engages them, the greater will be the power exerted.

Figure 10:
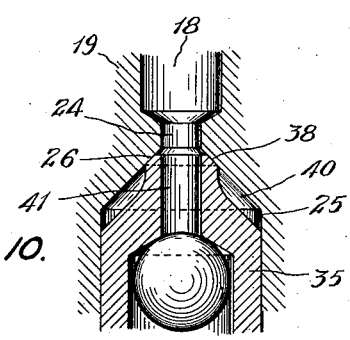

As shown in Figs. 2, 3 and 10, the upper end of the male coupling member or nipple 35, is cut away on the outside, adjacent to the contact surface 26 which forms a cavity or chamber 40 between said member 35 and the member 19, as shown. The design is such that the width of the surface 26 is very small so as to impart a relatively small area thereto. In practice I have found that such width should not exceed $\frac{1}{16}''$, but I prefer to make it even as small as $\frac{1}{32}''$.

By giving this surface such relatively small area, the amount of superficial contact between the two surfaces is so small that any obstructions in the nature of dirt, grit, etc., which may intervene when contact is made, are moved laterally and discharged either into the duct 41 of the member 35 or into the cavity or chamber 40. The size of the latter is such as to permit a considerable accumulation therein.

It will be noted that there is an area between the contacting portions of the inlet face of the gun nozzle which is sufficiently small so that the product of the area so formed multiplied by the pressure of the lubricant acting thereon, per unit of area, is less than the amount of contact maintaining pressure exerted by the pressure of the gun nozzle against the nipple. This is to prevent unseating of the nozzle contact face by the pressure of the lubricant contained between the faces when in operation which would permit loss of lubricant and loss of pressure of supplied lubricant.

It will also be noted that the seating or contact surfaces are conical or valve-like, which permits the male and female coupling members to be self centering.

As previously mentioned, the female coupling member 19 is subjected to much greater use than is the male member 35 and in consequence the contact surface 26 is subjected to far greater wearing action than is surface 38. In order to compensate for this condition I make the surface 26 much harder than surface 38. This may be accomplished in various ways, as for instance by making member 19 of case hardened steel and the nipple member 35 of plain cold rolled steel; by making member 19 of cold rolled steel and the member 35 of brass; by making member 19 of cold rolled steel and providing an end insert 42, at the top of member 35, Fig. 15, of a softer material such as tin, zinc, aluminum or hard fibre.

In all these instances, it will be seen that the contact surface of the female member is of markedly greater hardness than the contact surface of the male member, which compensates for the increased duty to which said female member is subjected and insures a long life thereto.

The specific form of the contacting surfaces of the male and female members may be varied without departing from the spirit of my invention, as shown in Figs. 8, 9, 11, 12, 13 and 14.

In Fig. 8 I have shown a form in which the entire top of member 35 is made conical but of an angularity different from that of the conical surface 38 so that a line contact is effected.

Figure 9:
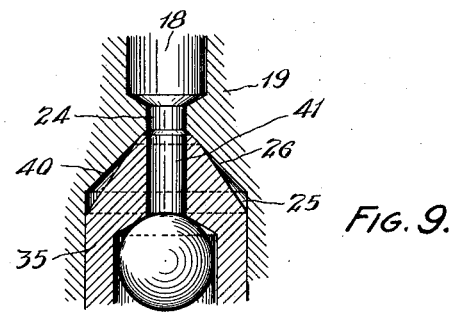

In Fig. 9 I have shown the upper end of member 35 slightly convex so as also to provide a line contact.

Figure 11:
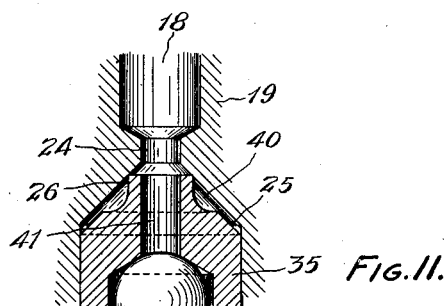

In Fig. 11 I have shown the top squared, which also produces a line contact.

Figure 12:
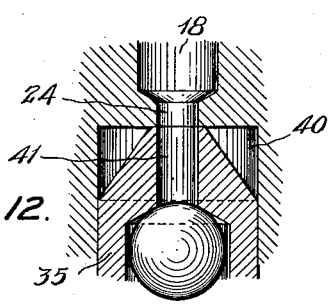

In the form shown in Fig. 12, the conical surfaces are dispensed with and square contact surfaces are provided, that of the male member being as before of relatively small area.

Figure 13:
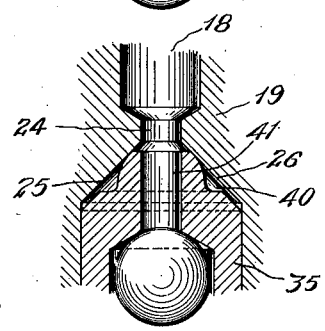

Fig. 13 shows a form similar to that illustrated by Fig. 9.

Figure 14:
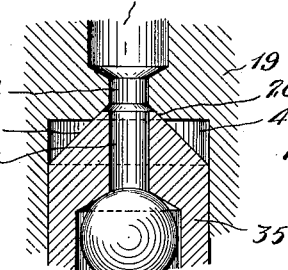
Figure 15:
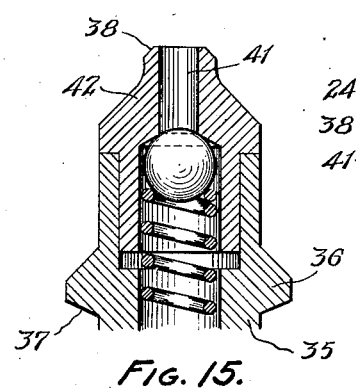

Fig. 14 shows a form in which the surface 26 is reduced to a comparatively small area and the area of the surface 38 is correspondingly greater.

In all these cases it will be seen that the male and female members are provided with contact surfaces one of which is relatively small, and adjacent to the outside of which a cavity or chamber is provided for receiving the dirt or grit expressed outwardly from between the two members.

What I claim is:

1. In high pressure lubricating apparatus of the class described, a lubricant coupling comprising a nipple element having an inlet, and a nozzle element having an outlet, said nozzle element adapted to form a quick detachable connection with a plurality of said inlet elements in succession, one of said elements having a recessed conical face and the other element having a circular edge to engage said face and form a metal to metal lubricant seal, guide means for holding said elements in axial alignment when in coupled relation, and quick releasable wedging clamp means for holding said elements firmly pressed together, the contact portion of one of said elements being harder than the other.

2. In high pressure lubricating apparatus of the class described, a lubricant coupling for repeated quick connecting and disconnecting, comprising a nipple element having an inlet, and a nozzle element having an outlet, one of said elements having a recessed conical face, and the other element having a circular edge to engage said face and form a metal to metal lubricant tight seal, guide means for holding said elements in axial alignment when in coupled relation, and quick releasable clamp means for holding said elements firmly pressed together, said clamp means comprising wedging surfaces on said nipple and nozzle, lever means for moving said wedging surfaces into engagement, and wedge means for operating said lever means.

3. In high pressure lubricating apparatus of the class described, the combination with a male coupling member, of a female coupling member, one of said members being adapted to be connected with a part to be lubricated and located in a relatively exposed position, the said female coupling member providing a lubricant conduit terminating in a contact surface, and a guiding surface beyond said contact surface, said male member providing a contact surface for engagement with the contact surface of the female member and further providing a guiding surface spaced from said contact surface and adapted to cooperate with the guiding surface of said female member to maintain said members in proper alignment, one of said members having a recess between its contact surface and its guiding surface to provide a chamber for the reception of any dirt which may have collected on said contact surfaces and which is forced therefrom by the coupling operation.

4. In high pressure lubricating apparatus of the class described, the combination of a male coupling member, a female coupling member, said two members having surfaces adapted to be placed in contact to form a lubricant seal therebetween, one of said members being provided with a wedge-like coupling surface, oscillatory jaws carried by the other of said members and means having wedge-like engagement with said jaws for urging said jaws into contact with said wedge-like coupling surfaces to draw said members together into lubricant tight contact.

Signed by me this 10th day of May, 1922.

OSCAR ZERK.